US012579942B2

(12) United States Patent
Gou et al.

(10) Patent No.: US 12,579,942 B2
(45) Date of Patent: Mar. 17, 2026

(54) GAMMA VOLTAGE REGULATION CIRCUIT, REGULATION METHOD, AND DRIVING DEVICE FOR DISPLAY PANEL

(71) Applicant: GLENFLY TECH CO., LTD. (SHANGHAI), Shanghai (CN)

(72) Inventors: Fei Gou, Shanghai (CN); Bin Sheng, Shanghai Free Trade Pilot Zone (CN); Zhifeng Mao, Shanghai (CN); Diansheng Zhang, Shanghai Free Trade Pilot Zone (CN); Jing Xie, Shanghai (CN); Wenwei Xu, Shanghai (CN); Wei Liu, Shanghai (CN)

(73) Assignee: GLENFLY TECH CO., LTD. (SHANGHAI), Shanghai (CN)

( * ) Notice: Subject to any disclaimer, the term of this patent is extended or adjusted under 35 U.S.C. 154(b) by 40 days.

(21) Appl. No.: 18/770,188

(22) Filed: Jul. 11, 2024

(65) Prior Publication Data

US 2025/0022424 A1 Jan. 16, 2025

(30) Foreign Application Priority Data

Jul. 11, 2023 (CN) ........................ 202310850827.0

(51) Int. Cl.
*G09G 3/3258* (2016.01)
*G09G 3/3275* (2016.01)
(Continued)

(52) U.S. Cl.
CPC ......... *G09G 3/3258* (2013.01); *G09G 3/3275* (2013.01); *G09G 3/20* (2013.01); *G09G 3/3696* (2013.01); *G09G 2310/0291* (2013.01); *G09G 2310/0297* (2013.01); *G09G 2310/08* (2013.01); *G09G 2320/0276* (2013.01); *G09G 2320/029* (2013.01); *G09G 2320/0673* (2013.01); *G09G 2330/021* (2013.01); *G09G 2330/028* (2013.01)

(58) Field of Classification Search
CPC ...... G09G 3/3258; G09G 3/3275; G09G 3/20; G09G 3/3696; G09G 2310/0291; G09G 2310/0297; G09G 2310/08; G09G 2320/0276; G09G 2320/029; G09G 2320/0673; G09G 2330/021; G09G 2330/028
See application file for complete search history.

(56) References Cited

U.S. PATENT DOCUMENTS 5,940,058 A * 8/1999 Koyama ............. G09G 3/3648 348/E5.074
2014/0197868 A1 * 7/2014 Huang .................. G09G 3/006 327/108

(Continued)

*Primary Examiner* — William Boddie
*Assistant Examiner* — Saifeldin E Elnafia
(74) *Attorney, Agent, or Firm* — Sughrue Mion, PLLC

(57) ABSTRACT

A gamma voltage regulation circuit set in a driver chip of a display panel, includes: an input circuit configured to determine a measured value of a power supply voltage of a power supply; a computing circuit configured to compute a variation value between the measured value and a reference value of the power supply voltage, an adjustment circuit configured to adjust a dynamic value of a reference voltage of a grayscale voltage generated by gamma correction through the variation value; and a third output circuit configured to output the grayscale voltage based on the dynamic value.

16 Claims, 9 Drawing Sheets

(51) Int. Cl.
*G09G 3/20* (2006.01)
*G09G 3/36* (2006.01)

(56) References Cited

U.S. PATENT DOCUMENTS

2018/0268780 A1* 9/2018 Bae ........................ G09G 5/026
2021/0043150 A1* 2/2021 Lee ...................... G09G 3/3291
2023/0282159 A1* 9/2023 Choi ........................ G09G 5/10
2024/0054931 A1* 2/2024 Park ......................... G09G 3/20

* cited by examiner

GAMMA VOLTAGE REGULATION CIRCUIT, REGULATION METHOD, AND DRIVING DEVICE FOR DISPLAY PANEL

CROSS-REFERENCE TO RELATED APPLICATION

This application claims priority from Chinese Patent Application No. 202310850827.0, filed with the China National Intellectual Property Administration on Jul. 11, 2023, the contents of which is incorporated herein by reference in its entirety.

FIELD

The disclosure relates to display panel, and more particularly, to gamma voltage regulation circuit, regulation method, and driving device for display panel.

BACKGROUND

In thin film transistor (TFT) pixel circuits, when the electroluminescent voltage drive drain (ELVDD) power supply voltage generated by a power management integrated circuit (PMIC) reaches a pixel end of a panel, there may be IR-Drop, resulting in a difference between the actual current and a result of an expression for the current value of the pixel current:

expression of the current value for the pixel current is:

$$I = \frac{1}{2}\mu C_{ox}\frac{W}{L}(ELVDDD - V_{DATA})^2,$$

where μ, $C_{ox}$, $$\frac{W}{L}$$

are the parameters of TFT pixel circuit, ELVDD is the power supply voltage generated by the PMIC, $V_{DATA}$ is the grayscale voltage generated by gamma correction, and the difference between ELVDD and $V_{DATA}$ determines the magnitude of the current.

In addition, manufacturing deviations in the chip manufacturing process may cause differences in the wiring resistance of Active Matrix Organic Light Emitting Diode (AMOLED) panels from different batches, resulting in fluctuations in screen brightness and color accuracy. Current solution for current fluctuations caused by IR-Drop around ELVDD may include measuring and regulating a screen GAMMA value to compensate for IR-Drop. However, such methods may require measuring the screen GAMMA and adjusting $V_{DATA}$ with multiple GAMMA values to achieve compensation, and algorithm support may be required.

SUMMARY

Provided are a gamma voltage regulation circuit, a regulation method, and driving device for display panels.

According to an aspect of the disclosure, a gamma voltage regulation circuit set in a driver chip of a display panel, includes: an input circuit configured to determine a measured value of a power supply voltage of a power supply; a computing circuit configured to compute a variation value between the measured value and a reference value of the power supply voltage, an adjustment circuit configured to adjust a dynamic value of a reference voltage of a grayscale voltage generated by gamma correction through the variation value; and a third output circuit configured to output the grayscale voltage based on the dynamic value.

According to an aspect of the disclosure, a gamma voltage regulation method, includes: detecting a power supply voltage and obtaining a measured value of the power supply voltage; setting a reference value of the power supply voltage; computing a variation value of the power supply voltage based on the measured value and the reference value; adjusting a dynamic value of a reference voltage of a grayscale voltage through the variation value; and outputting the grayscale voltage based on the dynamic value.

According to an aspect of the disclosure, a driving device for a display panel, includes: a power supply circuit; a driver chip comprising a gamma voltage regulation circuit; a row driver circuit; a scanning circuit; a pixel array; and a demultiplexer, wherein the driver chip is respectively connected to the demultiplexer, wherein the power supply circuit, the row driver circuit, the scanning circuit, and the power supply circuit are connected to both ends of the pixel array, and wherein the gamma voltage regulation circuit is connected between the power supply circuit and the pixel array to compensate for a voltage drop generated based on the power supply circuit providing a power voltage to the pixel array.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related “some embodiments” describe a subset of all possible embodiments. However, it may be understood that the “some embodiments” may be the same subset or different subsets of all the possible embodiments, and may be combined with each other without conflict. As used herein, each of such phrases as “A or B,” “at least one of A and B,” “at least one of A or B,” “A, B, or C,” “at least one of A, B, and C,” and “at least one of A, B, or C,” may comprise all possible combinations of the items enumerated together in a corresponding one of the phrases. For example, the phrase “at least one of A, B, and C” comprises within its scope “only A”, “only B”, “only C”, “A and B”, “B and C”, “A and C” and “all of A, B, and C.”

Some embodiments may address voltage drop affecting the display effect of screen pixels in the power supply voltage for AMOLED panels.

Some embodiments provide a gamma voltage regulation circuit set in the driver chip of the display panel (AMOLED panel), which is connected to the power supply circuit. It can eliminate the impact of voltage fluctuations in the input power voltage ELVDD of the AMOLED panel on the display brightness of the display screen. There is no need to correct processing verification steps by measuring the display screen brightness and gamma voltage curve, and no algorithm support is required. This regulation circuit may provide adaptive compensation through analog circuits.

Figure 1:
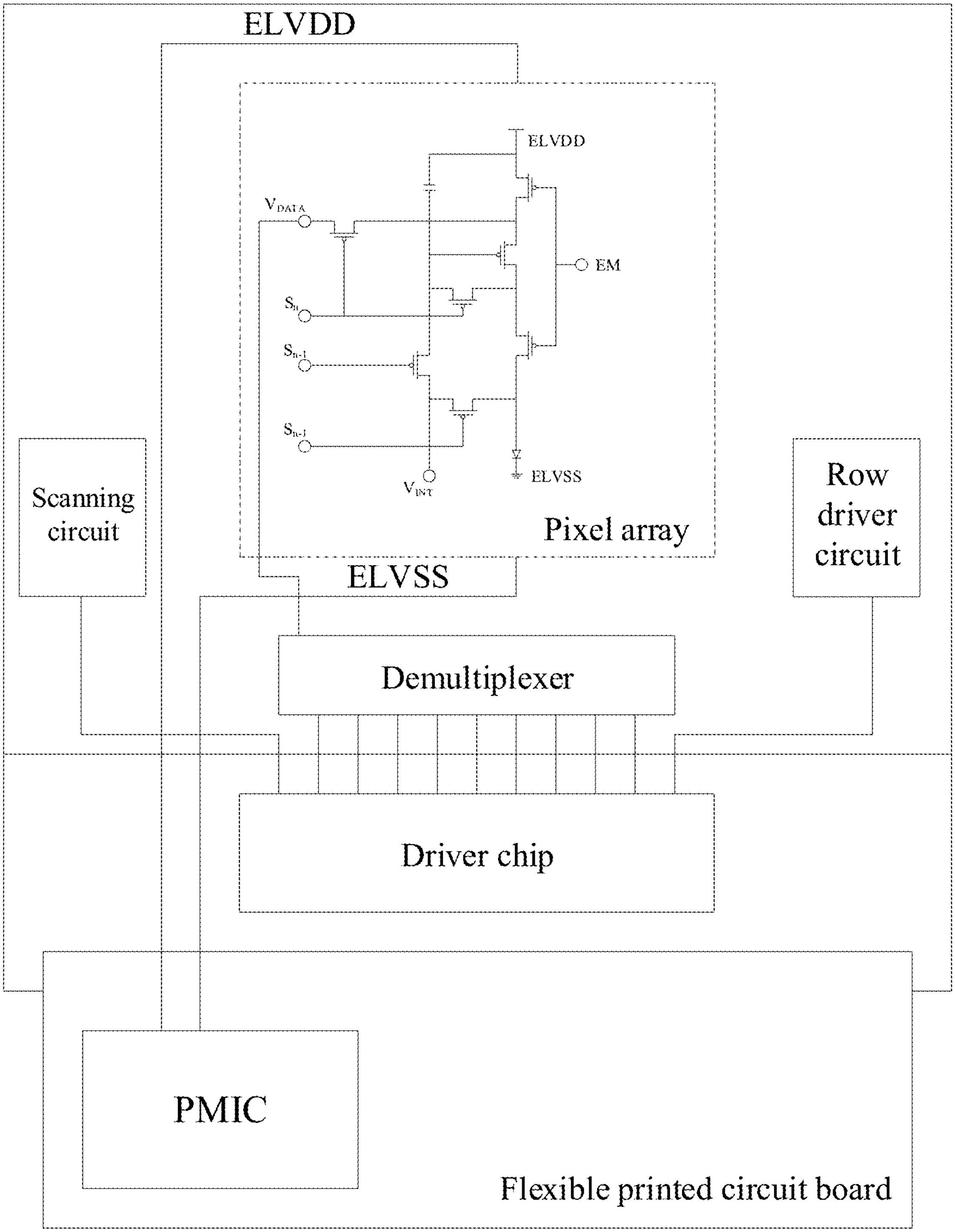
FIG.1 Related Art
FIG. 1 is a schematic diagram of a driver diagram of AMOLED panel.
Figure 2:
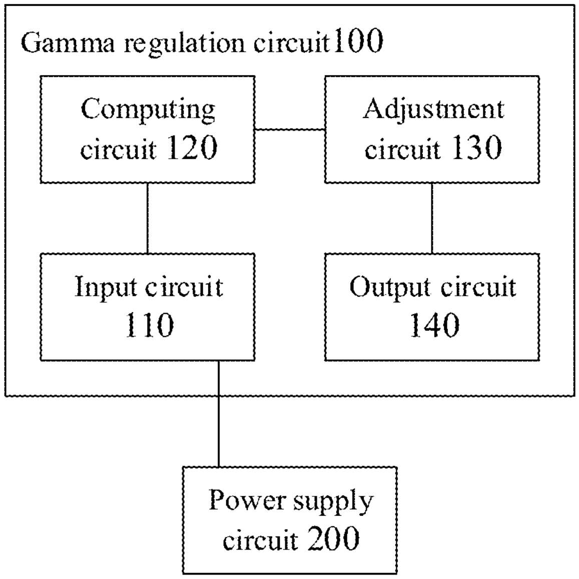
FIG. 2 is a schematic diagram of a structural diagram of the gamma voltage regulation circuit according to the first embodiment.

Referring to FIG. 2, the gamma regulation circuit 100 according to some embodiments comprises an input circuit 110, a computing circuit 120, an adjustment circuit 130, and a third output circuit 140. The input circuit 110 is connected to the power supply circuit 200 for detecting the power supply voltage of the power supply circuit 200 and inputting the measured value into computing circuit 120. The computing circuit 120 is connected to the input circuit 110 for computing the variation value ΔELVDD between the measured value ELVDD and the reference value ELVDD_REF of the power supply voltage. The adjustment circuit 130 is connected to the computing circuit 120 for adjusting the dynamic value of the reference voltage of the grayscale voltage generated by gamma correction through the variation value ΔELVDD. The third output circuit 140 is connected to the adjustment circuit 130 for outputting the grayscale voltage based on the dynamic values.

The regulation circuit 100 of these embodiments compares the measured value ELVDD of the power supply voltage with the reference value ELVDD_REF of the power supply voltage to obtain the variation value ΔELVDD of the power supply voltage by detecting the power supply voltage input to the display panel in real time, and compensates the voltage of this variation value ΔELVDD to the highest reference voltage VGMP/lowest reference voltage VGSP. As the reference level for the gamma grayscale voltage, VGMP/VGSP can dynamically adjust the voltage value of the $V_{DATA}$ under the same DATA digital input to maintain the voltage value of (ELVDD−$V_{DATA}$) unchanged, thereby maintaining current stability. Through the regulation circuit 100 of these embodiments, it is not necessary to adjust the image data DATA by measuring the gamma curve of the display panel and using algorithms, but to adaptively adjust the gamma voltage through the regulation circuit 100.

Figure 3:
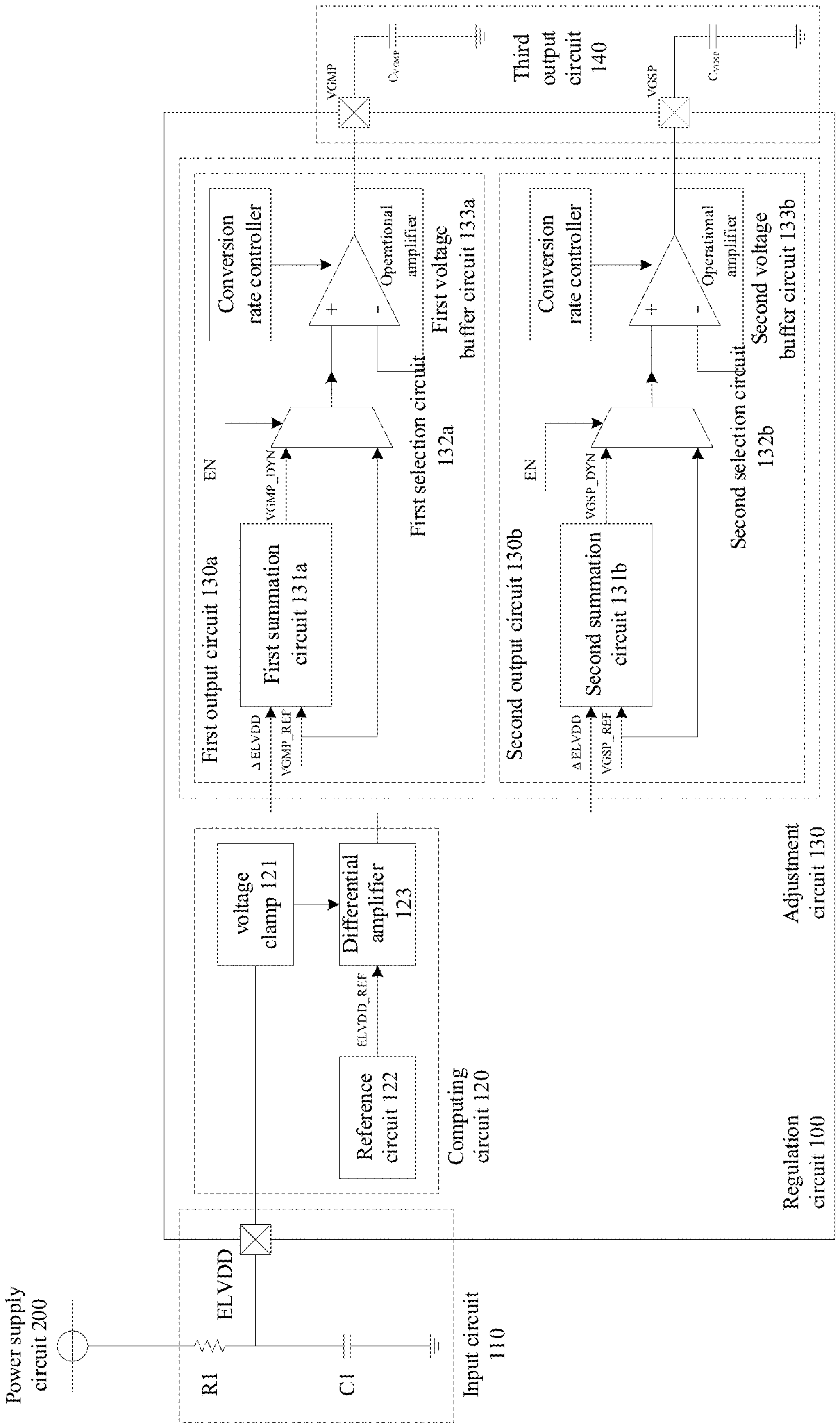
FIG. 3 is a circuit diagram of the gamma voltage regulation circuit according to the first embodiment.

Referring to FIG. 3, in the regulation circuit 100 of the first implementation of these embodiments, the computing circuit 120 comprises a voltage clamp 121, a reference circuit 122, and a differential amplifier 123. The voltage clamp 121 is connected to the input circuit 110. The differential amplifier 123 is respectively connected to the reference circuit 122 and the voltage clamp 121, and connected to the adjustment circuit 130. The voltage clamp 121 is used to control the measured value ELVDD of the power supply voltage detected from the power supply circuit within a range which can be set according to the actual requirements of the display panel. The reference circuit 122 is used to provide a reference value ELVDD_REF for the power supply voltage, which is the target voltage of the display panel. The differential amplifier 123 is used to compute the variation value ΔELVDD between the measured value ELVDD and the reference value ELVDD_REF of the power supply voltage, to subtract input voltage.

In the regulation circuit 100 of the first implementation, the adjustment circuit 130 comprises a first output circuit 130*a* and a second output circuit 130*b*. The first output circuit 130*a* and the second output circuit 130*b* are connected in parallel between the computing circuit 120 and the third output circuit 140. The first output circuit 130*a* is used to output the highest reference voltage VGMP, and the second output circuit 130*b* is used to output the lowest reference voltage VGSP. The first output circuit 130*a* comprises a first summation circuit 131*a*, a first selection circuit 132*a*, and a first voltage buffer amplifier 133*a* sequentially connected. The first summation circuit 131*a* is used to compute the sum of the variation value ΔELVDD of the power supply voltage and the reference value VGMP_REF of the highest reference voltage, to add input voltage, and to input the dynamic value VGMP_DYN of the highest reference voltage obtained into the first selection circuit 132*a*. The first selection circuit 132*a* is used to select to output the dynamic value VGMP_DYN or the reference value VGMP_REF of the highest reference voltage to the first voltage buffer amplifier 133*a* based on the variation value ΔELVDD of the power supply voltage, and can choose whether VGMP/VGSP adopts fixed level mode or adaptive mode. The first voltage buffer amplifier 133*a*, comprising a conversion rate controller and an operational amplifier, is a buffer for the voltage VGMP and is used to control the rate of change of the highest reference voltage VGMP output to the third output circuit 140. The second output circuit 130*b* comprises a second summation circuit 131*b*, a second selection circuit 132*b*, and a second voltage buffer amplifier 133*b* sequentially connected. The second summation circuit 131*b* is used to compute the sum of the variation value ΔELVDD of the power supply voltage and the reference value VGSP_REF of the lowest reference voltage, to add input voltage, and to input the dynamic value VGSP_DYN of the lowest reference voltage obtained into the second selection circuit 132*b*. The second selection circuit 132*b* is used to select to output the dynamic value VGSP_DYN or reference value VGSP_REF of the lowest reference voltage to the second voltage buffer amplifier 133*b* based on the variation value Δ ELVDD of the power supply voltage, and can choose whether VGMP/VGSP adopts fixed level mode or adaptive mode. The second voltage buffer amplifier 133*b*, comprising a conversion rate controller and operational amplifier, is a buffer for the voltage VGSP and is used to control the rate of change of the lowest reference voltage VGSP output to the third output circuit.

In the regulation circuit 100 of this first implementation, the power supply voltage ELVDD of the display panel comes from the power supply circuit 200. The power supply circuit 200 is a PMIC (Power Management IC). Due to the presence of load current and wiring resistance, the power supply voltage ELVDD may exhibit IR-Drop (voltage drop) and fluctuations. The power supply voltage ELVDD of the display panel may be detected by the input circuit 110 composed of low-pass filtering R1/C1.

When the power supply voltage ELVDD that enters the regulation circuit 100 is clamped by the voltage clamp 121 and is compared with the reference value ELVDD_REF of the power supply voltage set by the reference circuit 122, the voltage difference between the power supply voltage ELVDD and the reference value ELVDD_REF, which is the variation value ΔELVDD of the power supply voltage, is computed by the differential amplifier 123, and the computing formula is: (ELVDD-ELVDD_REF). The dynamic value VGMP_DYN of the highest reference voltage/the dynamic value VGSP_DYN of the lowest reference voltage output is obtained by summing this variation value ΔELVDD with the reference value VGMP_REF of the highest reference voltage/the reference value VGSP_REF of the lowest reference voltage respectively through the first summation circuit 131*a* and the second summation circuit 131*b*, and the computing formula is: (VGMP_REF+A ELVDD, VGSP_REF+ΔELVDD). After passing through the first voltage buffer amplifier 133*a* and the second voltage buffer amplifier 133*b*, the reference voltage VGMP/VGSP for the gamma grayscale voltage may be generated.

$V_{DATA}$ is an analog voltage generated from image data DATA through the gamma grayscale voltage digital-to-analog conversion. According to the magnitude of the $V_{DATA}$, there are three situations as follows.

Situation 1: When the initial target voltage of the $V_{DATA}$ is the reference value VGMP_REF of the highest reference voltage, the pixel target current $I_{TARGET1}$ is equal to the current value of the OLED (Organic Light-Emitting Diode) current $I_1$ generated by the modulation of the pixel target current $I_{TARGET1}$, both of which are $$\frac{1}{2}\mu C_{ox}\frac{W}{L}(\text{ELVDD\_REF} - \text{VGMP\_REF})^2.$$

In the situations that the power supply voltage ELVDD of the display panel changes relative to the reference value ELVDD_REF of the power supply voltage, the OLED current $I_1$ can be ensured to be the same as the pixel target current $I_{TARGET1}$, thereby eliminating the current fluctuations caused by the voltage fluctuations.

Situation 2: When the initial target voltage of the $V_{DATA}$ is the reference value VGSP_REF of the lowest reference voltage, the pixel target current $I_{TARGET2}$ is equal to the current value of the OLED current $I_2$ generated by the modulation of the pixel target current $I_{TARGET2}$, both of which are $$\frac{1}{2}\mu C_{ox}\frac{W}{L}[\text{ELVDD\_REF} - \text{VGSP\_REF}]^2.$$

In the situations that the power supply voltage ELVDD of the display panel changes relative to the reference value ELVDD_REF of the power supply voltage, the OLED current $I_2$ can be ensured to be the same as the pixel target current $I_{TARGET2}$, thereby eliminating the current fluctuations caused by the voltage fluctuations.

Situation 3: When the initial target voltage of the $V_{DATA}$ is the gamma grayscale voltage between the reference value VGMP_REF of the highest reference voltage and the reference value VGSP_REF of the lowest reference voltage, the gamma curve of more AMOLED (Active Matrix/Organic Light Emitting Diode) approximates a linear curve, so the pixel target current $I_{TARGET3}$ is equal to the current value of the OLED current $I_3$ generated by the modulation of the pixel target current $I_{TARGET3}$, both of which are $$\frac{1}{2}\mu C_{ox}\frac{W}{L}\{\text{ELVDD\_REF} - [\alpha * \text{VGMP\_REF} + (1-\alpha) * \text{VGSP\_REF}]\}^2,$$

where $0<\alpha<1$. In the situations that the power supply voltage ELVDD of the display panel changes relative to the reference value ELVDD_REF of the power supply voltage, the OLED current $I_3$ can be ensured to be the same as the pixel target current $I_{TARGET3}$, thereby eliminating the current fluctuations caused by the voltage fluctuations.

Figure 5A:
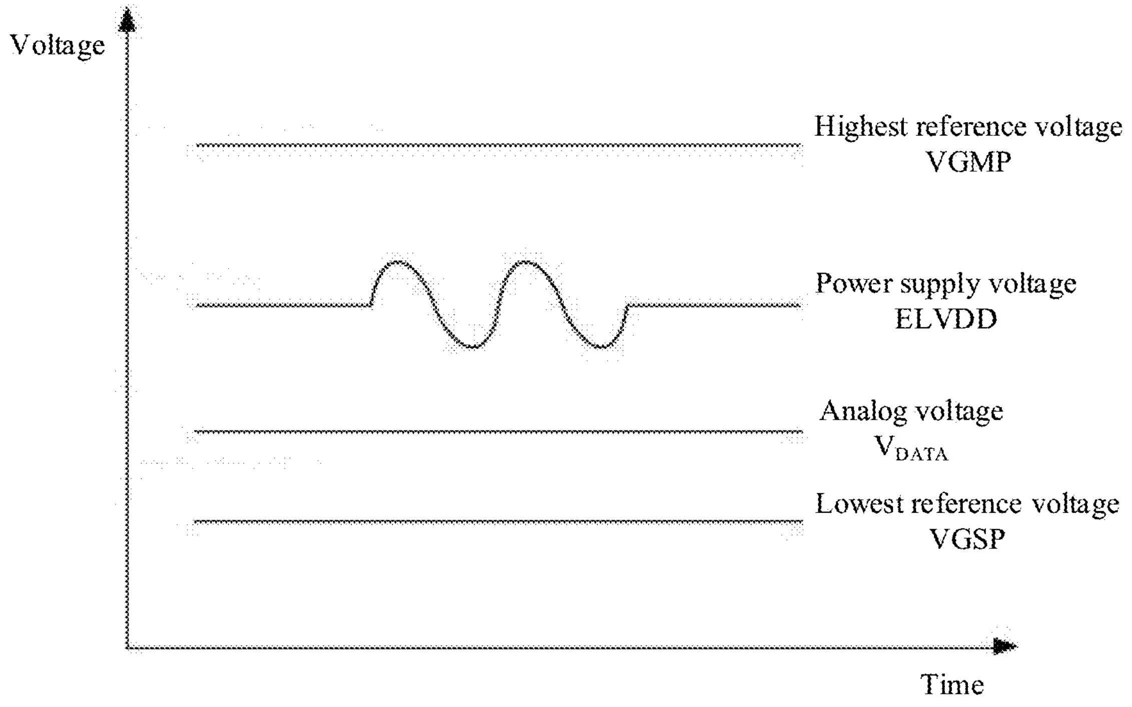
FIG. 5A is a schematic diagram of waveform without adjustment by enabling the power supply voltage in the gamma voltage regulation circuit according to the first embodiment.
Figure 5B:
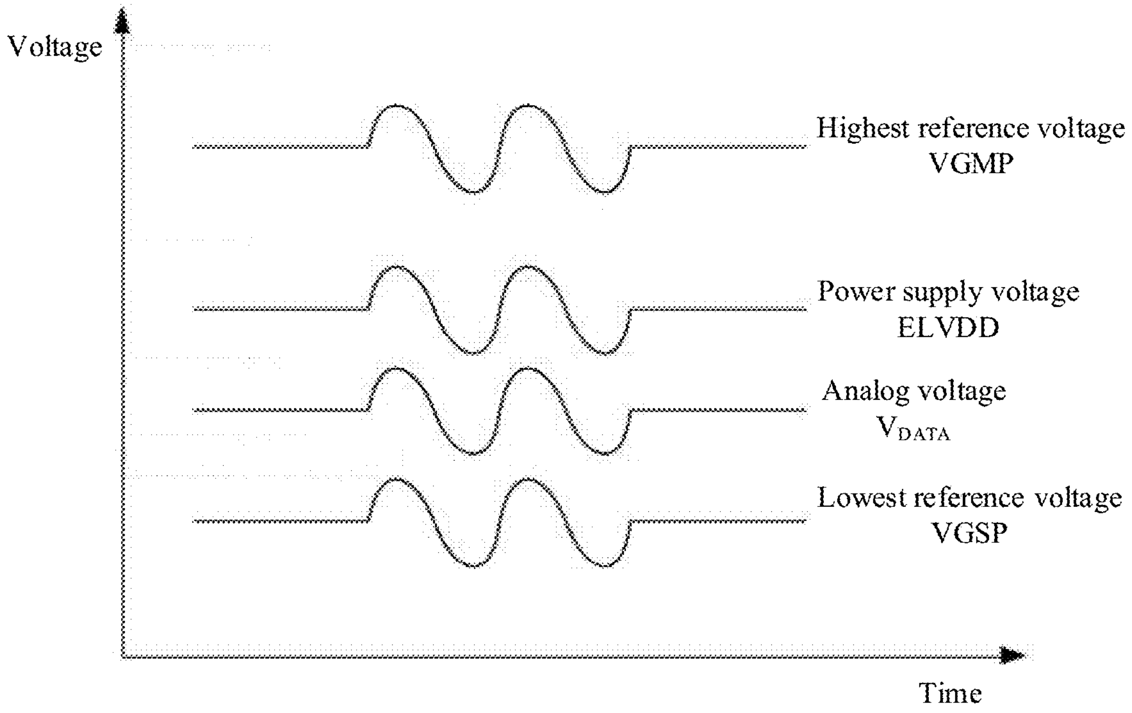
FIG. 5B is a schematic diagram of waveform with adjustment but without clamping by enabling the power supply voltage in the gamma voltage regulation circuit according to the first embodiment.
Figure 5C:
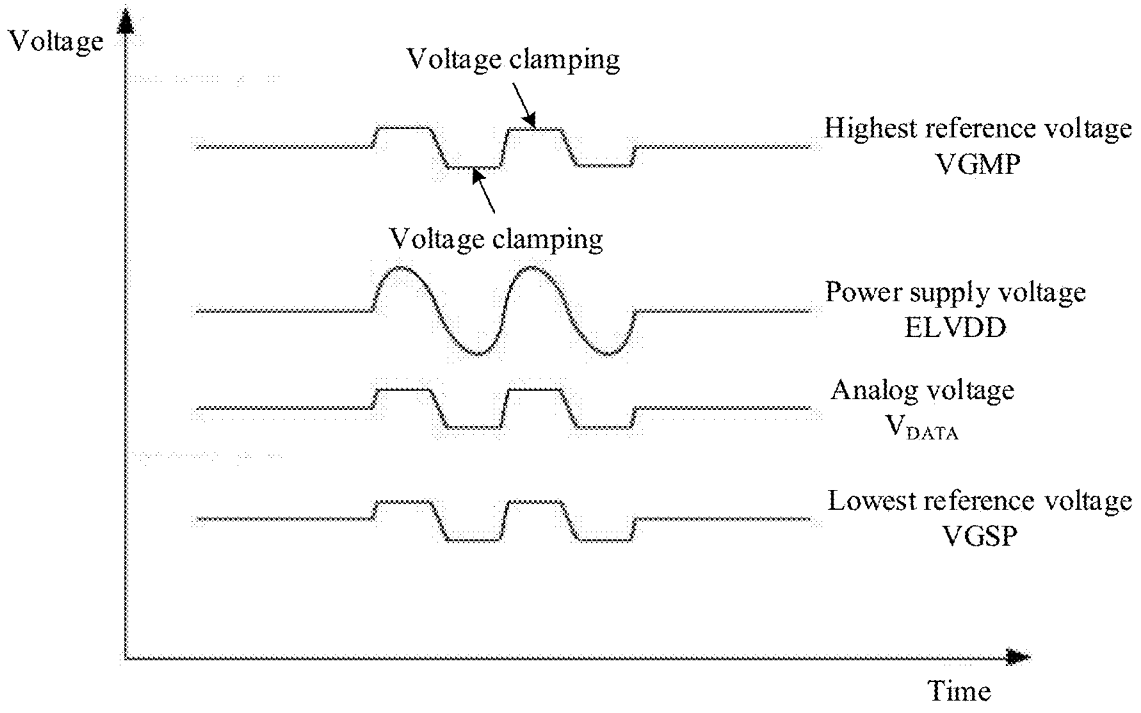
FIG. 5C is a schematic diagram of waveform with adjustment and clamping by enabling the power supply voltage in the gamma voltage regulation circuit according to the first embodiment.

The waveform diagram of the VGMP/VGSP is shown in the FIG. 5*a*-5*c*. Among them, FIG. 5*a* shows the VGMP/VGSP waveform when the adaptive adjustment mode is not enabled for the power supply voltage ELVDD. The highest reference voltage VGMP/the lowest reference voltage VGSP is a fixed voltage that does not adjust with changes in the power supply voltage ELVDD. FIG. 5*b* and FIG. 5*c* show the VGMP/VGSP waveform when the adaptive adjustment mode is enabled for the power supply voltage ELVDD. The highest reference voltage VGMP/the lowest reference voltage VGSP/the gamma grayscale voltage $V_{DATA}$ changes with changes in the power supply voltage ELVDD, wherein the mode in FIG. 5*c* has clamp function, when the fluctuation amplitude of the power supply voltage ELVDD exceeds a threshold, the VGMP/VGSP/$V_{DATA}$ will be clamped within the range, so that the impact of abnormal power supply voltage ELVDD on the gamma grayscale voltage may be limited.

Figure 4:
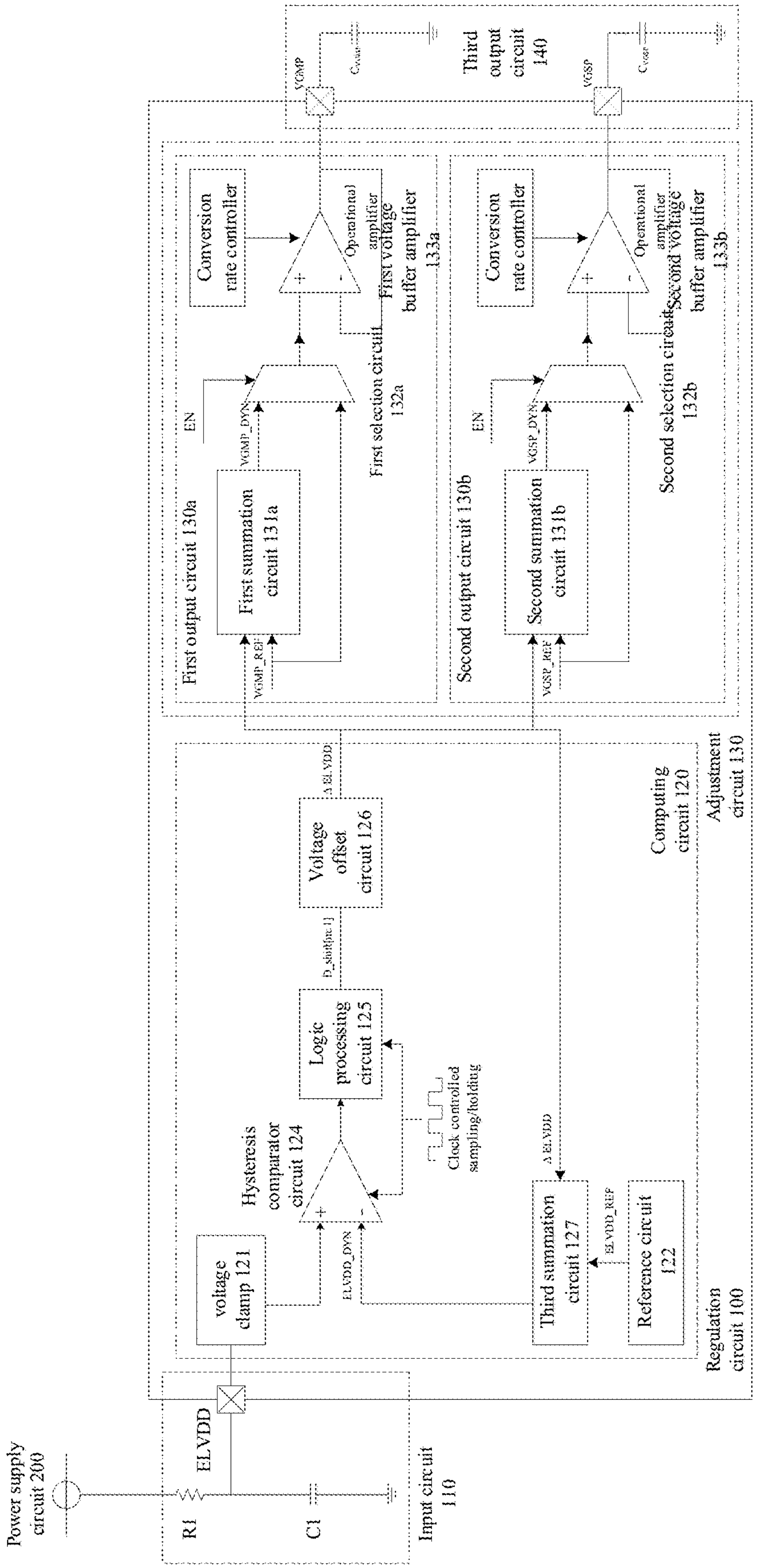
FIG. 4 is an another circuit diagram of the gamma voltage regulation circuit according to the first embodiment.

Referring to FIG. 4, in the regulation circuit 100 of the second implementation of these embodiments, the computing circuit 120 comprises a voltage clamp 121, a reference circuit 122, a hysteresis comparator circuit 124, a logic processing circuit 125, a voltage offset circuit 126, and a third summation circuit 127. The voltage clamp 121 is connected to the input circuit 110. The positive input end of the hysteresis comparator circuit 124 is connected to the voltage clamp 121, the negative input end of the hysteresis comparator circuit 124 is connected to the third summation circuit 127, and the output end of the hysteresis comparator circuit 124 is connected to the logic processing circuit 125. The voltage offset circuit 126 is connected between the logic processing circuit 125 and the third summation circuit 127, and is connected to the adjustment circuit 130. The reference circuit 122 is connected to the third summation circuit 127. The voltage clamp 121 is used to control the measured value ELVDD of the power supply voltage detected from the power supply circuit 200 within a range. The reference circuit 122 is used to provide a reference value ELVDD_REF for the power supply voltage, which is the target voltage of the display panel. The third summation circuit 127 is used to compute the sum of the reference value ELVDD_REF and the variation value ΔELVDD of the power supply voltage, and to output the dynamic value ELVDD_DYN of the power supply voltage to the hysteresis comparator circuit 124, which the initial value of the dynamic value ELVDD_DYN of the power supply voltage is the reference value ELVDD_REF of the power supply voltage, to add input voltage. The hysteresis comparator circuit 124 is a threshold voltage comparator used to compare the sampled measured value ELVDD and the sampled dynamic value ELVDD_DYN of the power supply voltage under the control of a clock controlled signal, and to output the hysteresis comparison result VO[1:0] to the logic processing circuit 125 for processing. The logic processing circuit 125 is used to determine whether the measured value ELVDD of the power supply voltage is within the upper threshold value (ELVDD_DYN+$\Delta V_{HYS}$) and lower threshold value (ELVDD_DYN−$\Delta V_{HYS}$) of the dynamic value ELVDD_DYN of the power supply voltage based on the hysteresis comparison result VO[1:0], to perform three types of processing on the output D_shift[m:1]: "+1/−1/maintain", to set a maximum offset range of the output D_shift[m:1] for clamping additionally, and to output a processing scheme to the voltage offset circuit 126. The voltage offset circuit 126 is used to adjust the magnitude of the variation value ΔELVDD of the power supply voltage based on the processing scheme, clock by clock cycle, which can generate offset voltage input to the third summation circuit 127 for addition and summation operation, and to output the variation value to the adjustment circuit 130. In the regulation circuit 100 of this second implementation, the structure of the adjustment circuit 130 is the same as that of the first implementation.

In the regulation circuit 100 of this second implementation, the power supply voltage ELVDD of the display panel comes from the power supply circuit 200. The power supply circuit 200 is a PMIC. Due to the presence of load current and wiring resistance, the power supply voltage ELVDD may exhibit IR-Drop (voltage drop) and fluctuations. The power supply voltage ELVDD of the display panel may be detected by the input circuit 110 composed of low-pass filtering R1/C1.

Figure 6:
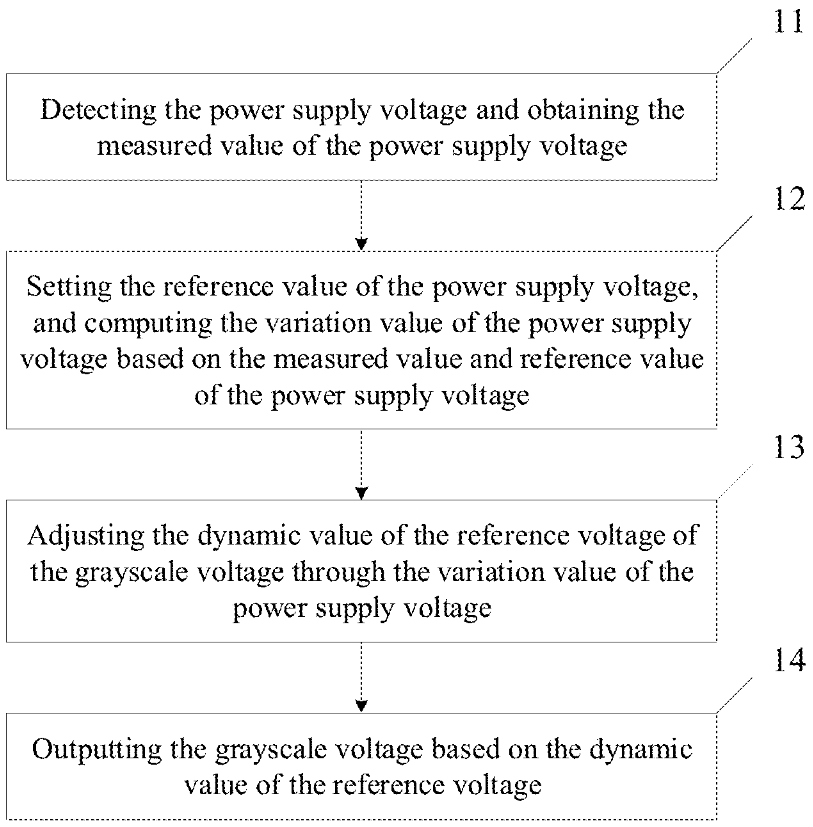
FIG. 6 is a flowchart of the gamma voltage regulation method according to the second embodiment.

When the power supply voltage ELVDD that enters the regulation circuit 100 is clamped by the voltage clamp 121 and is compared with the dynamic value ELVDD_DYN of the power supply voltage output from the third summation circuit 127 (the initial value is the reference value ELVDD_REF of the power supply voltage), the hysteresis comparator circuit 124 outputs VO[1:0] to represent the magnitude relationship between the measured value ELVDD of power supply voltage and the dynamic value ELVDD-DYN of power supply voltage under the control of a clock controlled clock, the logic processing circuit 125 perform addition and subtraction clock by clock on the value D_shift [m:1] generating the offset voltage ΔELVDD, after continuously compensating for the reference value ELVDD_REF of the power supply voltage by the offset voltage ΔELVDD, the dynamic value ELVDD_DYN of the power supply voltage may approach the measured value ELVDD of the power supply voltage. The summation operation between the offset voltage ΔELVDD and the reference value VGMP_REF of the highest reference voltage/the reference value VGSP_REF of the lowest reference voltage may be completed respectively through the first summation circuit 131*a* and the second summation circuit 131*b*, the dynamic value VGMP_DYN of the highest reference voltage/the dynamic value VGSP_DYN of the lowest reference voltage is output, and the computing formula is: (VGMP_REF+ΔELVDD, VGSP_REF+ΔELVDD). After passing through the first voltage buffer amplifier 133*a* and the second voltage buffer amplifier 133*b*, the reference voltage VGMP/VGSP of the gamma grayscale voltage may be generated. The hysteresis comparison results output by the hysteresis comparator circuit 124 and the operational logic actions of the logic processing circuit 125 are shown in Table 1. The compensation process for the reference value ELVDD_REF of the power supply voltage is shown in FIG. 6. Under clock controlled sampling and logic processing, the compensation voltage gradually changes clock by clock and has smoothness.

TABLE 1

Corresponding table for the output of the hysteresis comparator circuit and the processing scheme of the logic processing circuit

| State | Output of the threshold comparator at the n-th clock moment | Operational logic action |
|---|---|---|
| ELVDD > ELVDD_DYN + $\Delta V_{HYS}$ | VO[1:0] = 2b11 | The time period from the n-th clock to the (n + 1)-th clock: D_shift[m:1] = D_shift[m:1] + 1, value plus 1. |
| ELVDD_DYN + $\Delta V_{HYS}$ ≥ ELVDD ≥ ELVDD_DYN − $\Delta V_{HYS}$ | VO[1:0] = 2b10 | The time period from the n-th clock to the (n + 1)-th clock: D_shift[m:1] = D_shift[m:1], value remains unchanged. |
| ELVDD < ELVDD_DYN − $\Delta V_{HYS}$ | VO[1:0] = 2b00 | The time period from the n-th clock to the (n + 1)-th clock: D_shift[m:1] = D_shift[m:1] − 1, value minus 1. |

Some embodiments provide a gamma voltage regulation method. It can eliminate the impact of voltage fluctuations in the input power voltage ELVDD of the AMOLED panel on the display brightness of the display screen. There is no need to correct processing verification steps by measuring the display screen brightness and gamma voltage curve, and no algorithm support is required. This regulation circuit may provide adaptive compensation through analog circuits.

Referring to FIG. 6, the gamma voltage regulation method of these embodiments comprising:

S11: detecting the power supply voltage and obtaining the measured value of the power supply voltage;

S12: setting the reference value of the power supply voltage, and computing the variation value of the power supply voltage based on the measured value and reference value of the power supply voltage;

S13: adjusting the dynamic value of the reference voltage of the grayscale voltage through the variation value of the power supply voltage;

S14: outputting the grayscale voltage based on the dynamic value of the reference voltage.

The regulation method of these embodiments compares the measured value ELVDD of the power supply voltage with the reference value ELVDD_REF of the power supply voltage to obtain the variation value ΔELVDD of the power supply voltage by detecting the power supply voltage input to the display panel in real time, and compensates the voltage of this variation value ΔELVDD to the highest reference voltage VGMP/lowest reference voltage VGSP.

As the reference level for the gamma grayscale voltage, VGMP/VGSP can dynamically adjust the voltage value of the $V_{DATA}$ under the same DATA digital input to maintain the voltage value of (ELVDD−$V_{DATA}$) unchanged, thereby maintaining current stability. Through the regulation method of these embodiments, it is not necessary to adjust the image data DATA by measuring the gamma curve of the display panel and using algorithms, but to adaptively adjust the gamma voltage through the regulation method.

In the regulation method of some embodiments, the reference voltage of the grayscale voltage comprises the highest reference voltage VGMP and the lowest reference voltage VGSP; by setting the highest reference voltage and the lowest reference voltage of the grayscale voltage, computing the sum of the highest reference voltage VGMP and the variation value ΔELVDD, as well as the sum of the lowest reference voltage VGSP and the variation value ΔELVDD, to obtain the dynamic value VGMP_DYN of the highest reference voltage and the dynamic value VGSP_DYN of the lowest reference voltage, respectively; by controlling the computing frequency of the dynamic value VGMP_DYN of the highest reference voltage and the dynamic value VGSP_DYN of the lowest reference voltage, the change speed of the output is controlled.

In the regulation method of some embodiments, the variation value ΔELVDD of the power supply voltage is obtained by computing the difference between the measured value ELVDD of the power supply voltage and the reference value ELVDD_REF.

Figure 7:
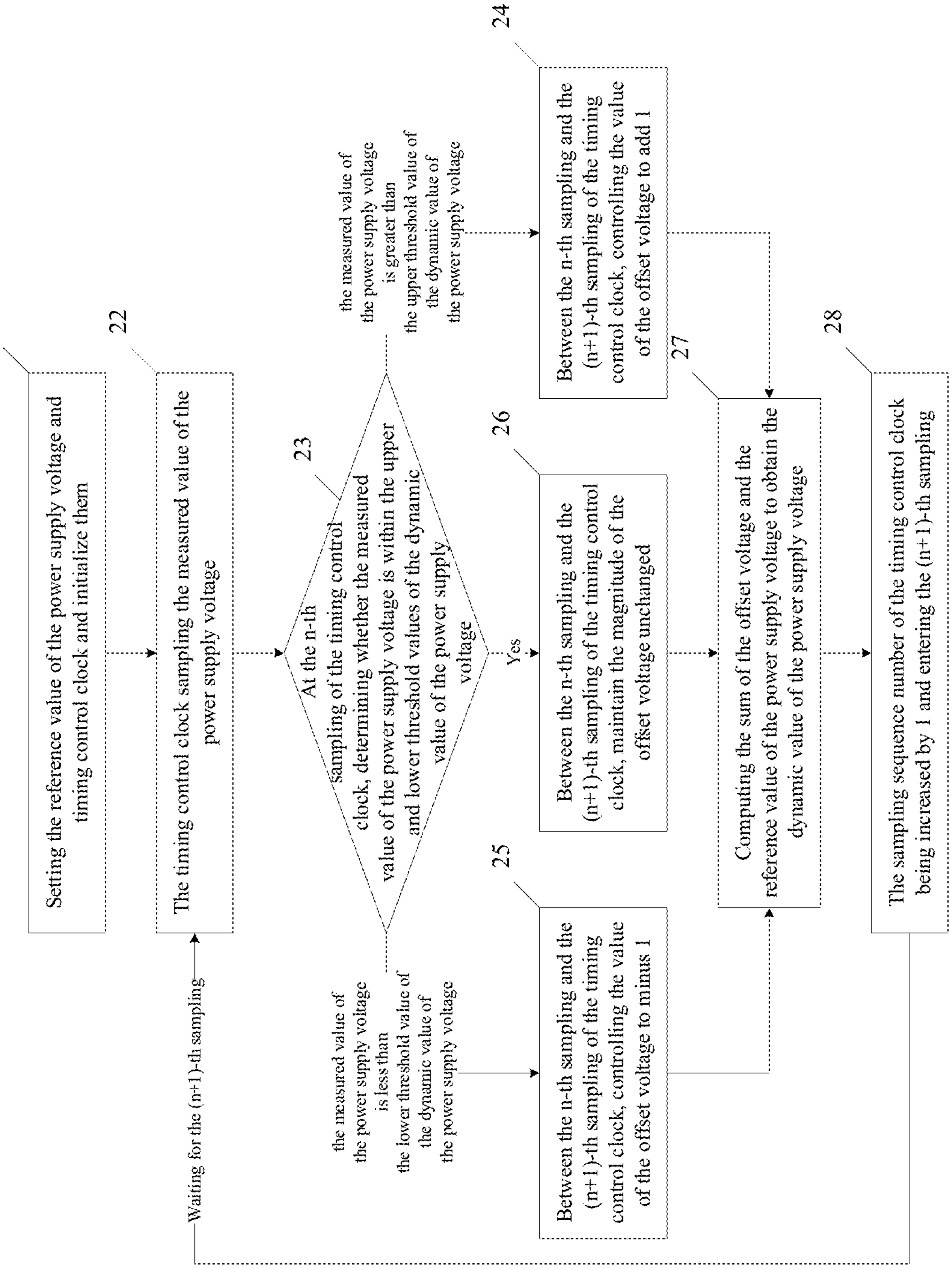
FIG. 7 is a flowchart of computing offset voltage through clock control in the gamma voltage regulation method according to the second embodiment.

In the regulation method of some embodiments, the variation value ΔELVDD of the power supply voltage is obtained by controlling the accumulated offset voltage through a clock, referring to FIG. 7, and the process is as follows:

- S21: setting the reference value of the power supply voltage and timing control clock and initialize them; the dynamic value of the power supply voltage is initialized as the reference value of the power supply voltage, and the timing control clock is initialized to D_shift[m:1];
- S22: the timing control clock sampling the measured value of the power supply voltage;
- S23: at the n-th sampling of the timing control clock, determining whether the measured value of the power supply voltage is within the upper and lower threshold values of the dynamic value of the power supply voltage;
- if the measured value of the power supply voltage is greater than the upper threshold value of the dynamic value of the power supply voltage, performing S24: between the n-th sampling and the (n+1)-th sampling of the timing control clock, controlling the value of the offset voltage to add 1;
- if the measured value of the power supply voltage is less than the lower threshold value of the dynamic value of the power supply voltage, performing S25: between the n-th sampling and the (n+1)-th sampling of the timing control clock, controlling the value of the offset voltage to minus 1;
- if the measured value of the power supply voltage is within the range of the upper and lower threshold values of the dynamic value of the power supply voltage, performing S26: between the n-th sampling and the (n+1)-th sampling of the timing control clock, maintain the magnitude of the offset voltage unchanged;
- S27: computing the sum of the offset voltage and the reference value of the power supply voltage to obtain the dynamic value of the power supply voltage;
- S28: the sampling sequence number of the timing control clock being increased by 1 and entering the (n+1)-th sampling.

When the power supply voltage ELVDD is clamped and compared with the dynamic value ELVDD_DYN of the power supply voltage (the initial value is the reference value ELVDD_REF of the power supply voltage), the value of VO[1:0] is output to represent the magnitude relationship between the measured value ELVDD of power supply voltage and the dynamic value ELVDD-DYN of power supply voltage under the control of a clock controlled clock, and the addition and subtraction clock by clock on the value D_shift[m:1] generating the offset voltage ΔELVDD are performed, after continuously compensating for the reference value ELVDD_REF of the power supply voltage by the offset voltage ΔELVDD, the dynamic value ELVDD_DYN of the power supply voltage may approach the measured value ELVDD of the power supply voltage. The summation operation between the offset voltage ΔELVDD and the reference value VGMP_REF of the highest reference voltage/the reference value VGSP_REF of the lowest reference voltage may be completed respectively, the dynamic value VGMP_DYN of the highest reference voltage/the dynamic value VGSP_DYN of the lowest reference voltage may be output, and the computing formula may be: (VGMP_REF+ΔELVDD, VGSP_REF+ΔELVDD). After through buffering, the reference voltage VGMP/VGSP of the gamma grayscale voltage may be generated. The comparison results between the power supply voltage ELVDD and the dynamic value ELVDD_DYN of the power supply voltage and the operational logic actions are shown in Table 1 above. Under clock controlled sampling and logic processing, the compensation voltage gradually changes clock by clock and has smoothness.

Some embodiments provide a driving device for a display panel. Through setting a gamma voltage regulation circuit in the driver chip of the display panel (AMOLED panel), the driver device can eliminate the impact of voltage fluctuations in the input power voltage ELVDD of the AMOLED panel on the display brightness of the display screen. There is no need to correct processing verification steps by measuring the display screen brightness and gamma voltage curve, and no algorithm support is required. This regulation circuit may provide adaptive compensation through analog circuits.

Figure 8:
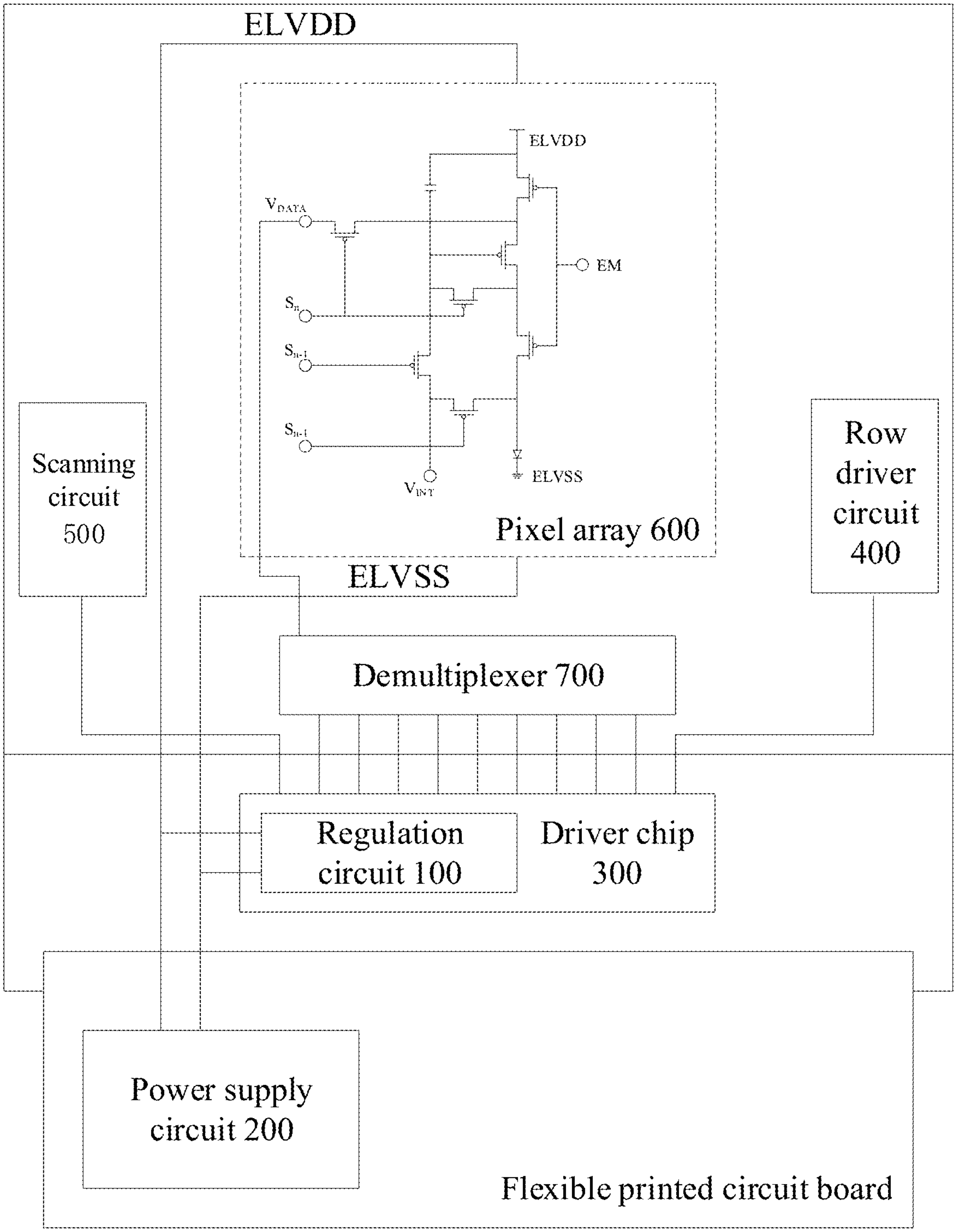
FIG. 8 is a schematic diagram of structural diagram of the driving device for the display panel according to the third embodiment.

Referring to FIG. 8, the driver device for the display panel of these embodiments comprising a power supply circuit 200, a driver chip 300, a row driver circuit 400, a scanning circuit 500, a pixel array 600 and a demultiplexer 700. The driver chip is respectively connected to the demultiplexer, the power circuit, the row driver circuit, and the scanning circuit. The power circuit is connected to both ends of the pixel array and provides a power supply voltage. The driver chip is equipped with a gamma voltage regulation circuit 100 as described in some embodiments. The gamma voltage regulation circuit is connected between the power supply circuit and the pixel array to compensate for the voltage drop generated when the power supply circuit provides power voltage to the pixel array.

The driver device for the display panel of these embodiments compares the measured value ELVDD of the power supply voltage with the reference value ELVDD_REF of the power supply voltage to obtain the variation value ΔELVDD of the power supply voltage by detecting the power supply voltage input to the display panel in real time, and compensates the voltage of this variation value ΔELVDD to the highest reference voltage VGMP/lowest reference voltage VGSP. As the reference level for the gamma grayscale voltage, VGMP/VGSP can dynamically adjust the voltage value of the $V_{DATA}$ under the same DATA digital input to maintain the voltage value of (ELVDD-$V_{DATA}$) unchanged, thereby maintaining current stability. Through the driver device of these embodiments, it is not necessary to adjust the image data DATA by measuring the gamma curve of the display panel and using algorithms, but to adaptively adjust the gamma voltage through the regulation circuit 100.

According to some circuits may exist respectively or be combined into one or more circuits. Some circuits may be further split into multiple smaller circuits, thereby implementing the same operations without affecting the technical effects of some embodiments. The circuits are divided based on logical functions. In actual applications, a function of one circuit may be realized by multiple circuits, or functions of multiple circuits may be realized by one circuit. In some embodiments, additional circuits may be included. In actual applications, these functions may also be realized cooperatively by the other circuits, and may be realized cooperatively by multiple circuits.

A person skilled in the art would understand that these circuits could be implemented by analog or digital hardware logic, by a processor or processors executing computer software code, or by a combination of both. The circuits may also be implemented in software stored in a memory of a computer or a non-transitory computer-readable medium, where the instructions of each circuit are executable by a processor to thereby cause the processor to perform the respective operations of the corresponding circuit.

The gamma voltage regulation circuit, regulation method, and driving device of display panel in some embodiments enable compensate for the power supply voltage through a follower circuit, thereby ensuring that the pixel current is consistent with the design value, which has an implementation method, saves digital circuit resources, has a wide compensation range, and can smoothly change the compensation voltage.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A gamma voltage regulation circuit set in a driver chip of a display panel, comprising:
- an input circuit configured to determine a measured value of a power supply voltage of a power supply;
- a computing circuit configured to compute a variation value between the measured value and a reference value of the power supply voltage, the computing circuit comprising:
  - a voltage clamp configured to control the measured value within a range,
  - a reference circuit configured to provide the reference value, and
  - a differential amplifier configured to receive an output of the voltage clamp as a first input and the reference value as a second input and compute the variation value;
- an adjustment circuit configured to adjust, based on the variation value, a dynamic value of a reference voltage of a grayscale voltage generated by gamma correction; and
- a third output circuit configured to output the grayscale voltage based on the dynamic value.

2. The gamma voltage regulation circuit according to claim 1, wherein the computing circuit further comprises a hysteresis comparator circuit, a logic processing circuit, a voltage offset circuit, and a third summation circuit.

3. The gamma voltage regulation circuit according to claim 2, wherein,
- wherein the reference circuit is further configured to determine the reference value,
- wherein the hysteresis comparator circuit is configured to determine a hysteresis comparison result based on the measured value and the dynamic value,
- wherein the logic processing circuit is configured to determine a processing scheme based on whether the measured value is within an upper threshold value and a lower threshold value of the dynamic value based on the hysteresis comparison result,
- wherein the voltage offset circuit is configured to determine the variation value based on adjusting a magnitude of the variation value based on the processing scheme and a clock-by-clock cycle, and
- wherein the third summation circuit configured to determine the dynamic value based on a sum of the reference value and the variation value, wherein an initial value of the dynamic value is the reference value.

4. The gamma voltage regulation circuit according to claim 1, wherein the adjustment circuit comprises a first output circuit and a second output circuit,
- wherein the first output circuit comprises:
  - a first summation circuit;
  - a first selection circuit; and
  - a first voltage buffer amplifier, and
- wherein the second output circuit comprises:
  - a second summation circuit;
  - a second selection circuit; and
  - a second voltage buffer amplifier.

5. The gamma voltage regulation circuit according to claim 4,
- wherein the first summation circuit is configured to determine a first dynamic value based on a first sum of the variation value and a first reference value of a highest reference voltage,
- wherein the first selection circuit is configured to determine a first selected value from among the first dynamic value and the first reference value based on the variation value,
- wherein the first voltage buffer amplifier is configured to control a first rate of change of the first reference value,
- wherein the second summation circuit is configured to determine a second dynamic value based on a second sum of the variation value and a second reference value of a lowest reference voltage,
- wherein the second selection circuit is configured to determine a second selected value from among the second dynamic value and the second reference value based on the variation value, and wherein the second voltage buffer amplifier is configured to control a second rate of change of the second reference value.

6. A gamma voltage regulation method, comprising:

detecting a power supply voltage and obtaining a measured value of the power supply voltage;

setting a reference value of the power supply voltage;

computing a variation value of the power supply voltage based on the measured value and the reference value, the computing comprising:

controlling, by a voltage clamp, the measured value within a range, providing, by a reference circuit, the reference value, and computing, by a differential amplifier configured to receive an output of the voltage clamp as a first input and the reference value as a second input, the variation value;

adjusting, based on the variation value, a dynamic value of a reference voltage of a grayscale voltage through the variation value; and outputting the grayscale voltage based on the dynamic value.

7. The gamma voltage regulation method according to claim 6, wherein the computing the variation value comprises computing a difference between the measured value and the reference value.

8. The gamma voltage regulation method according to claim 7, wherein the computing the variation value comprises controlling an accumulated offset voltage through a clock.

9. The gamma voltage regulation method according to claim 8, wherein the controlling the accumulated offset voltage through the clock comprises:

initializing the dynamic value to the reference value;

initializing a timing control clock to 1; and sampling the measured value based on the timing control clock.

10. The gamma voltage regulation method according to claim 9, wherein the controlling the accumulated offset voltage through the clock further comprises:

at an n-th sampling of the timing control clock, determining whether the measured value of the power supply voltage is within an upper threshold value of the dynamic value and lower threshold value of the dynamic value;

based on the measured value being greater than the upper threshold value, incrementing the accumulated offset voltage for the n-th sampling and an (n+1)-th sampling of the timing control clock;

based on the measured value being less than the lower threshold value, decrementing the accumulated offset voltage for the n-th sampling and the (n+1)-th sampling; and based on the measured value of the power supply voltage being within the upper threshold value and the lower threshold value, leaving the accumulated offset voltage unchanged for the n-th sampling and the (n+1)-th sampling.

11. The gamma voltage regulation method according to claim 10, wherein the controlling the accumulated offset voltage through the clock further comprises computing the dynamic value based on a sum of the accumulated offset voltage and the reference value;

incrementing a sampling sequence number of the timing control clock; and entering the (n+1)-th sampling.

12. The gamma voltage regulation method according to claim 6, wherein the reference voltage comprises a highest reference voltage and a lowest reference voltage.

13. The gamma voltage regulation method according to claim 12, wherein the adjusting the dynamic value comprises:

computing a first dynamic value based on a first sum of the highest reference voltage and the variation value;

computing a second dynamic value based on a second sum of the lowest reference voltage and the variation value;

controlling an output speed based on controlling a first computing frequency of the first dynamic value and controlling a second computing frequency of the second dynamic value.

14. A driving device for a display panel, comprising:

a power supply circuit;

a driver chip comprising a gamma voltage regulation circuit;

a row driver circuit;

a scanning circuit;

a pixel array; and a demultiplexer, wherein the driver chip is respectively connected to the demultiplexer, wherein the power supply circuit, is connected to both ends of the pixel array, wherein the scanning circuit and the row driver circuit are connected to the driver chip, wherein the gamma voltage regulation circuit is connected between the power supply circuit and the pixel array to compensate for a voltage drop generated based on the power supply circuit providing a power voltage to the pixel array, and wherein the gamma voltage regulation circuit comprises:

an input circuit configured to determine a measured value of a power supply voltage of a power supply, a computing circuit configured to compute a variation value between the measured value and a reference value of the power supply voltage, the computing circuit comprising:

a voltage clamp configured to control the measured value within a range, a reference circuit configured to provide the reference value, and a differential amplifier configured to receive an output of the voltage clamp as a first input and the predetermined reference value as a second input and compute the variation value, an adjustment circuit configured to adjust a dynamic value of a reference voltage of a grayscale voltage generated by gamma correction through the variation value, and a third output circuit configured to output the grayscale voltage based on the dynamic value.

15. The driving device according to claim 14, wherein the reference circuit is further configured to determine the reference value, wherein the computing circuit further comprises:

a hysteresis comparator circuit configured to determine a hysteresis comparison result based on the measured value and the dynamic value;

a logic processing circuit configured to determine a processing scheme based on whether the measured value is within an upper threshold value and a lower threshold value of the dynamic value based on the hysteresis comparison result;

a voltage offset circuit configured to determine the variation value based on adjusting a magnitude of the variation value based on the processing scheme and a clock-by-clock cycle; and a third summation circuit configured to determine the dynamic value based on a sum of the reference value and the variation value, wherein an initial value of the dynamic value is the reference value.

16. The driving device according to claim 14, wherein the adjustment circuit comprises a first output circuit and a second output circuit, wherein the first output circuit comprises:

a first summation circuit configured to determine a first dynamic value based on a first sum of the variation value and a first reference value of a highest reference voltage;

a first selection circuit configured to determine a first selected value from among the first dynamic value and the first reference value based on the variation value; and a first voltage buffer amplifier configured to control a first rate of change of the first reference value, and wherein the second output circuit comprises:

a second summation circuit configured to determine a second dynamic value based on a second sum of the variation value and a second reference value of a lowest reference voltage;

a second selection circuit configured to determine a second selected value from among the second dynamic value and the second reference value based on the variation value; and a second voltage buffer amplifier configured to control a second rate of change of the second reference value.

* * * * *